US012669346B2

(12) United States Patent
Zhao et al.

(10) Patent No.: US 12,669,346 B2
(45) Date of Patent: Jun. 30, 2026

(54) METHOD, DEVICE AND SYSTEM FOR UPDATING MAP OF UNLOADING AREA OF OPEN PIT MINE

(71) Applicant: Jiangsu XCMG Construction Machinery Research Institute Ltd., Xuzhou (CN)

(72) Inventors: Bin Zhao, Xuzhou (CN); Jianlin Tang, Xuzhou (CN); Chao Yang, Xuzhou (CN)

(73) Assignee: Jiangsu XCMG Construction Machinery Research Institute Ltd., Xuzhou (CN)

( * ) Notice: Subject to any disclaimer, the term of this patent is extended or adjusted under 35 U.S.C. 154(b) by 263 days.

(21) Appl. No.: 18/259,041

(22) PCT Filed: Dec. 24, 2020

(86) PCT No.: PCT/CN2020/138939
§ 371 (c)(1),
(2) Date: Jun. 22, 2023

(87) PCT Pub. No.: WO2022/133885
PCT Pub. Date: Jun. 30, 2022

(65) Prior Publication Data
US 2024/0053164 A1     Feb. 15, 2024

(51) Int. Cl.
*G01C 21/00*          (2006.01)
(52) U.S. Cl.
CPC ................................ *G01C 21/3807* (2020.08)
(58) Field of Classification Search
CPC ................................................. G01C 21/3807
See application file for complete search history.

(56) References Cited

U.S. PATENT DOCUMENTS

2010/0046800 A1     2/2010 Clark et al.
2017/0023372 A1*    1/2017 Van Latum ........ G01C 21/3453
(Continued)

FOREIGN PATENT DOCUMENTS

CN        102131986 B      4/2014
CN        106104206 A     11/2016
(Continued)

OTHER PUBLICATIONS

International Search Report issued in PCT/CN2020/138939 on Sep. 24, 2021, (Chinese and English translation).
(Continued)

*Primary Examiner* — Adnan M Mirza
(74) *Attorney, Agent, or Firm* — Morgan, Lewis & Bockius LLP

(57)          ABSTRACT

A method, device and system for updating a map of an unloading area (UA) of an open pit mine, which relate to the technical field of open pit mines. The method includes: acquiring one or more coordinates of one or more first preset positions of auxiliary operation equipment (11) during an operation (302), wherein the auxiliary operation equipment (11) trims a retaining wall (L) that acts as a physical boundary of the unloading area (UA) during the operation, and during the operation of the auxiliary operation equipment (11), each first preset position is located within the unloading area (UA); determining a first coordinate set (304), the first coordinate set (304) including coordinates among the one or more coordinates located outside of a first map of the unloading area (UA); and according to the first coordinate set (304), updating the first map into a second map (306).

10 Claims, 7 Drawing Sheets

(56)            References Cited

U.S. PATENT DOCUMENTS

| | | | |
|---|---|---|---|
| 2017/0248439 A1 | 8/2017 | Sakai et al. | |
| 2017/0285655 A1* | 10/2017 | Katou ................. | G09B 29/007 |
| 2020/0141745 A1 | 5/2020 | Van Latum et al. | |

FOREIGN PATENT DOCUMENTS

| | | | |
|---|---|---|---|
| CN | 107247718 A | 10/2017 |
| CN | 106575489 B | 4/2019 |
| CN | 111125135 A | 5/2020 |
| CN | 111260913 A | 6/2020 |
| CN | 111443360 A | 7/2020 |
| CN | 111522898 A | 8/2020 |
| CN | 111552291 A | 8/2020 |
| CN | 111601276 A | 8/2020 |
| CN | 111780768 A | 10/2020 |
| CN | 111829507 A | 10/2020 |
| JP | 2017049172 A | 3/2017 |

OTHER PUBLICATIONS

Written Opinion issued in PCT/CN2020/138939 on Sep. 24, 2021, (Chinese and English translation).

* cited by examiner

Acquire one or more coordinates of one or more first preset positions of an auxiliary operation equipment during operation process    302

Determine a first coordinate set    304

Update the first map to a second map according to the first coordinate set    306

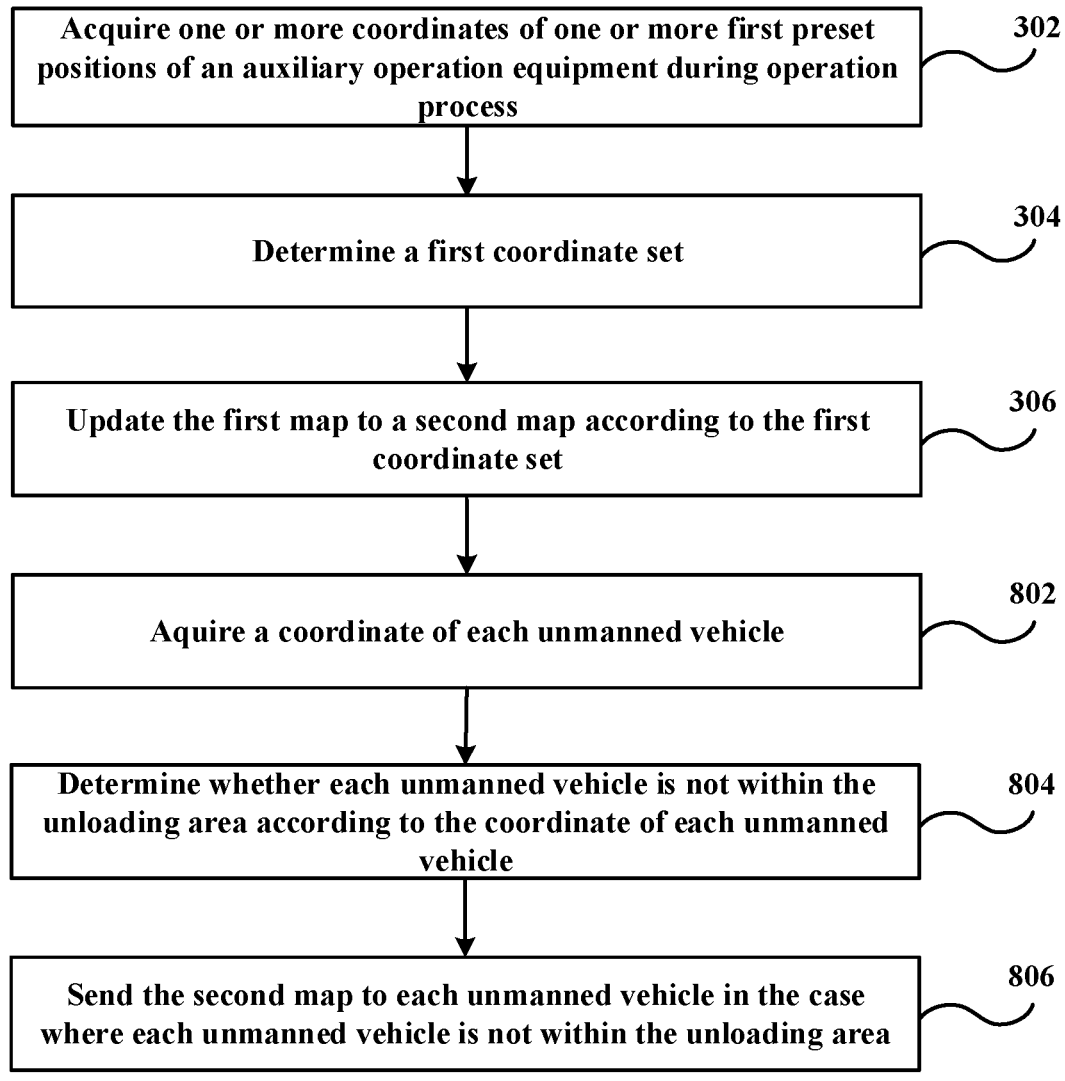

Acquire one or more coordinates of one or more first preset positions of an auxiliary operation equipment during operation process — 302

Determine a first coordinate set — 304

Update the first map to a second map according to the first coordinate set — 306

Aquire a coordinate of each unmanned vehicle — 802

Determine whether each unmanned vehicle is not within the unloading area according to the coordinate of each unmanned vehicle — 804

Send the second map to each unmanned vehicle in the case where each unmanned vehicle is not within the unloading area — 806

Fig. 8

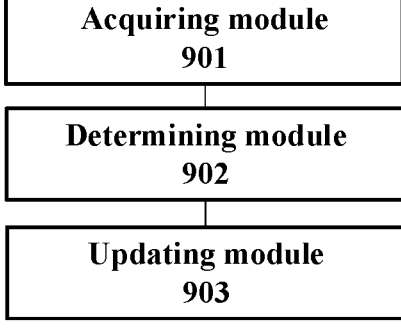

Acquiring module
901

Determining module
902

Updating module
903

Fig. 9

METHOD, DEVICE AND SYSTEM FOR UPDATING MAP OF UNLOADING AREA OF OPEN PIT MINE

CROSS REFERENCE TO RELATED APPLICATION

This application is a 371 national stage application based on International Application No. PCT/CN2020/138939, filed Dec. 24, 2020, the contents of which are hereby incorporated by reference in their entirety.

TECHNICAL FIELD

The present disclosure relates to the technical field of open pit mine, in particular to a map updating method, device and system for an unloading area of an open pit mine.

BACKGROUND

Open pit mines are in remote regions and harsh environments, and transport drivers are prone to safety accidents during the process of material transport. Therefore, unmanned transport in open pit mines emerges.

However, due to the particularity and complexity of open pit mines, the realization of unmanned transport in open pit mines is confronted with many problems.

SUMMARY

According to an aspect of the embodiments of the present disclosure, provided is a method for updating map of an unloading area of an open pit mine. The method comprises: acquiring one or more coordinates of one or more first preset positions of an auxiliary operation equipment during operation process, wherein the auxiliary operation equipment trims a retaining wall as a physical boundary of the unloading area during the operation process, and, each first preset position is located within the unloading area during the operation process of the auxiliary operation equipment; determining a first coordinate set, wherein the first coordinate set comprises a coordinate, of the one or more coordinates, outside a first map of the unloading area; and updating the first map to a second map according to the first coordinate set.

In some embodiments, the updating the first map to a second map according to the first coordinate set comprises: determining a second coordinate set, wherein the second coordinate set comprises coordinates of a plurality of first boundary points of the first map; and determining a union of the first coordinate set and the second coordinate set, wherein the union comprises coordinates of a plurality of second boundary points of the second map.

In some embodiments, the acquiring one or more coordinates of one or more first preset positions of an auxiliary operation equipment during operation process comprises: acquiring a coordinate of a second preset position of the auxiliary operation equipment during the operation process, wherein the second preset position is provided with a first positioning device; and determining the one or more coordinates of the one or more first preset positions according to the coordinate of the second preset position and a size of the auxiliary operation equipment.

In some embodiments, the auxiliary operation equipment comprises at least one of a loader or a bulldozer, wherein: the loader comprises a first front wheel and a second front wheel; the bulldozer comprises a first track and a second track; and the one or more first preset positions comprise at least one of the first front wheel, the second front wheel, the first track or the second track.

In some embodiments, the loader further comprises a first back wheel and a second back wheel, and the one or more first preset positions further comprise at least one of the first back wheel or the second back wheel.

In some embodiments, wherein the one or more first preset positions comprise a frontmost position of the first front wheel along a first travel direction of the loader, a frontmost position of the second front wheel along the first travel direction, a frontmost position of the first track along a second travel direction of the bulldozer and a frontmost position of the second track along the second travel direction.

In some embodiments, the one or more first preset positions further comprise a backmost position of the first track along the second travel direction and a backmost position of the second track along the second travel direction.

In some embodiments, the method further comprises: planning an entry path and an exit path in the unloading area of each unmanned vehicle of one or more unmanned vehicles according to the first map, before updating the first map to the second map; and planning the entry path and the exit path in the unloading area of each unmanned vehicle according to the second map, after updating the first map to the second map.

In some embodiments, the unloading area comprises a plurality of areas, and the entry path and the exit path do not overlap with a first area in a case where the auxiliary operation equipment is in the first area.

In some embodiments, the method further comprises: acquiring a coordinate of each unmanned vehicle; determining whether each unmanned vehicle is not within the unloading area according to the coordinate of each unmanned vehicle; and sending the second map to each unmanned vehicle, in a case where each unmanned vehicle is not within the unloading area, so that each unmanned vehicle updates the first map stored by itself to the second map.

In some embodiments, the method further comprises: sending the second map to the auxiliary operation equipment, in the case where each unmanned vehicle is not within the unloading area, so that the auxiliary operation equipment updates the first map stored by itself to the second map.

According to another aspect of the embodiments of the present disclosure, provided is a device for updating map of an unloading area of an open pit mine. The device comprises: an acquiring module configured to acquire one or more coordinates of one or more first preset positions of an auxiliary operation equipment during operation process, wherein the auxiliary operation equipment trims a retaining wall as a physical boundary of the unloading area during the operation process, and, each first preset position is located within the unloading area during the operation process of the auxiliary operation equipment; a determining module configured to determine a first coordinate set, wherein the first coordinate set comprises a coordinate, of the one or more coordinates, outside a first map of the unloading area; and an updating module configured to update the first map to a second map according to the first coordinate set.

According to still another aspect of the embodiments of the present disclosure, provided is a device for updating map of an unloading area of an open pit mine. The device comprises: a memory; and a processor coupled to the memory and configured to perform the map updating method according to any of the above embodiments based on instructions stored in the memory.

According to a further aspect of the embodiments of the present disclosure, provided is a system for updating map of an unloading area of an open pit mine. The system comprises: an industrial personal computer arranged on an auxiliary operation equipment and comprising an auxiliary operation management system, wherein the auxiliary operation management system is configured to acquire one or more coordinates of one or more first preset positions of the auxiliary operation equipment during operation process; and determine a first coordinate set, wherein the first coordinate set comprises a coordinate, of the one or more coordinates, outside a first map of the unloading area, wherein the auxiliary operation equipment trims a retaining wall as a physical boundary of the unloading area during the operation process, and each first preset position is located within the unloading area during the operation process of the auxiliary operation equipment; and a fleet management system configured to update the first map stored by itself to a second map according to the first coordinate set.

In some embodiments, the system further comprises: a first positioning device arranged at a second preset position of the auxiliary operation equipment and configured to send a coordinate of the second preset position to the auxiliary operation management system, wherein the auxiliary operation management system is configured to determine the one or more coordinates of the one or more first preset positions according to the coordinate of the second preset position and a size of the auxiliary operation equipment.

In some embodiments, the system further comprises: a second positioning device arranged on each unmanned vehicle of one or more unmanned vehicles and configured to send a coordinate of each unmanned vehicle to the fleet management system, wherein the fleet management system is further configured to determine whether each unmanned vehicle is within the unloading area according to the coordinate of each unmanned vehicle, and send the second map to each unmanned vehicle, in a case where each unmanned vehicle is not within the unloading area, so that each unmanned vehicle updates the first map stored by itself to the second map.

In some embodiments, the fleet management system is further configured to send the second map to the auxiliary operation management system, in the case where each unmanned vehicle is not within the unloading area, so that the auxiliary operation management system updates the first map stored by itself to the second map.

According to a further aspect of the embodiments of the present disclosure, provided is a computer-readable storage medium having stored thereon computer program instructions that, when executed by a processor, implement the map updating method according to any of the above embodiments.

The technical solutions of the present disclosure will be further described in detail below by way of the accompanying drawings and embodiments.

BRIEF DESCRIPTION OF THE ACCOMPANYING DRAWINGS

To explain the embodiments of the present disclosure or the technical solutions in the prior art more clearly, the accompanying drawings required to be used in the description of the embodiments or the prior art will be briefly introduced below. It is apparent that, the accompanying drawings illustrated below are merely some of the embodiments of the present disclosure. For those of ordinary skill in the art, other accompanying drawings may also be obtained according to these accompanying drawings on the premise that no inventive effort is involved.

FIG. 8 is a flowchart of a method for updating map of an unloading area of an open pit mine according to other embodiments of the present disclosure;

FIG. 9 is a schematic structural view showing a device for updating map of an unloading area of an open pit mine according to some embodiments of the present disclosure;

DETAILED DESCRIPTION

The technical solutions in the embodiments of the present disclosure will be clearly and completely described below in conjunction with the accompanying drawings in the embodiments of the present disclosure. Apparently, the embodiments described are merely some of the embodiments of the present disclosure, rather than all the embodiments. Based on the embodiments of the present disclosure, all the other embodiments obtained by those of ordinary skill in the art on the premise that no inventive effort is involved shall fall into the protection scope of the present disclosure.

Unless otherwise specified, the relative arrangements, numerical expressions and numerical values of the components and steps expounded in these examples shall not limit the scope of the present invention.

At the same time, it should be understood that, for ease of description, the dimensions of various parts shown in the accompanying drawings are not drawn according to actual proportional relations.

The techniques, methods, and devices known to those of ordinary skill in the relevant art might not be discussed in detail. However, the techniques, methods, and devices shall be considered as a part of the granted description where appropriate.

Among all the examples shown and discussed here, any specific value shall be construed as being merely exemplary, rather than as being restrictive. Thus, other examples in the exemplary embodiments may have different values.

It is to be noted that: similar reference signs and letters present similar items in the following accompanying drawings, and therefore, once an item is defined in one accompanying drawing, it is necessary to make further discussion on the same item in the subsequent accompanying drawings.

The inventors have noticed that, with the accumulation of materials unloaded by an unmanned vehicle, the map of the unloading area changes frequently. In the related art, the map of the unloading area is surveyed and drawn and updated manually, thereby affecting the operation efficiency.

In view showing this, the embodiments of the present disclosure provide the following technical solutions.

Figure 1:
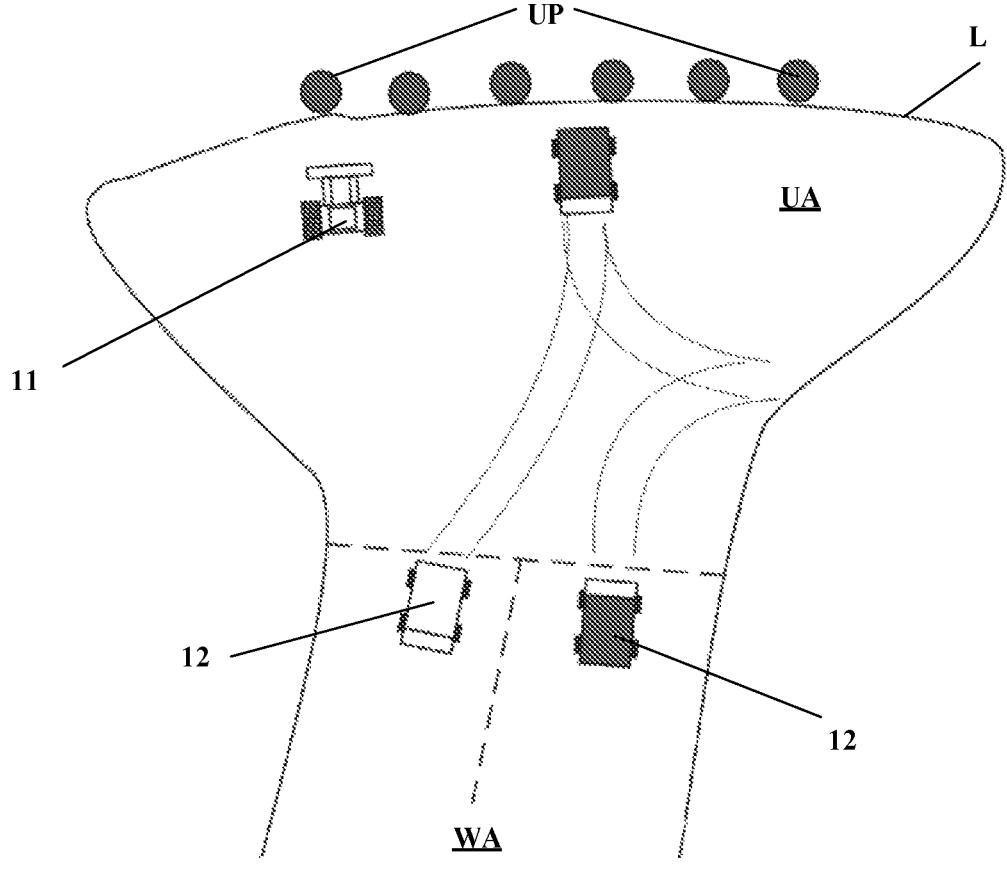
FIG. 1 is a schematic view showing an operation scene of an auxiliary operation equipment and an unmanned vehicle in an unloading area according to some embodiments of the present disclosure.
Figures 2, 3:
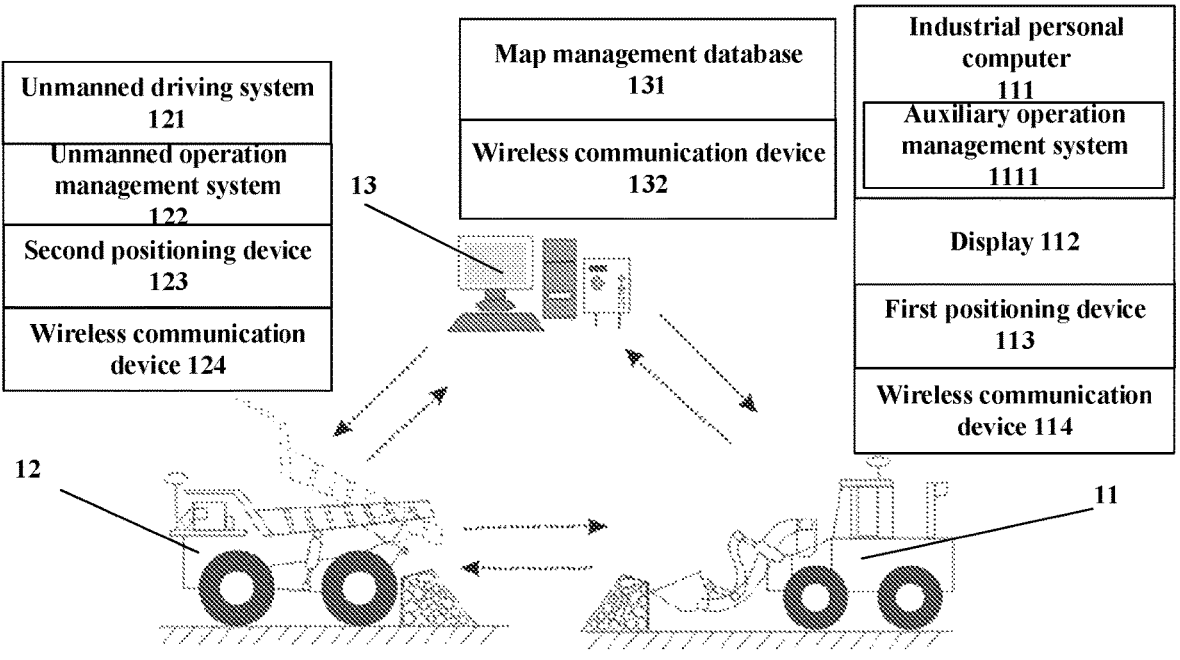
FIG. 2 is a schematic structural view showing a fleet management system, an unmanned vehicle and an auxiliary operation equipment according to some embodiments of the present disclosure.
FIG. 3 is a flow chart of a method for updating map of an unloading area of an open pit mine according to some embodiments of the present disclosure.

FIG. 1 is a schematic view showing an operation scene of an auxiliary operation equipment and an unmanned vehicle in an unloading area according to some embodiments of the present disclosure. FIG. 2 is a schematic structural view showing a fleet management system, an unmanned vehicle and an auxiliary operation equipment according to some embodiments of the present disclosure.

FIG. 1 shows an unloading area UA, a waiting area WA adjacent to the unloading area UA, a retaining wall L as physical boundary of the unloading area UA, and a plurality of unloading points UP.

As shown in FIG. 1, the auxiliary operation equipment 11 and the unmanned vehicle 12 are in operation in the unloading area UA. In some embodiments, the auxiliary operation equipment 11 may comprise a loader, a bulldozer, or the like. In some embodiments, the unmanned vehicle 12 is an unmanned mining truck.

The auxiliary operation equipment 11 performs auxiliary operation in the unloading area UA under the operation of an operator. For example, the auxiliary operation equipment 11 pushes the materials thrown by the unmanned vehicle 12 in the unloading area UA from the inside of the retaining wall L as physical boundary of the unloading area UA (that is, one side of the retaining wall L proximate to the waiting area WA) to the outside of the retaining wall L (that is, one side of the retaining wall L away from the waiting area WA), and trims the retaining wall L. For example, the auxiliary operation equipment 11 trims the retaining wall L to have a certain slope. When the material pile exceeds the height of the retaining wall L, the retaining wall L is pushed outward, so that the boundary of the unloading area UA extends outward continuously.

As shown in FIG. 2, the auxiliary operation equipment 11 may be provided with an industrial personal computer 111, a display 112, a first positioning device 113 and a wireless communication device 114. The industrial personal computer 111 is configured to run the auxiliary operation management system 1111. The display 112 is configured to display information such as a login interface of the auxiliary operation management system 1111, a map of the unloading area UA, an unloading path, and a travel speed of the auxiliary operation equipment 11. The operator can use the display 112 for human-computer interaction. The auxiliary operation management system 1111 is configured to perform collaborative management of the operation flow of the unloading area UA, so that the unmanned vehicle 12 can normally complete the operations such as entry, unloading and exit. The first positioning device 113 is configured to provide the real-time position, heading information or the like of the auxiliary operation equipment 11.

As shown in FIG. 2, the unmanned vehicle 12 may be provided with an unmanned driving system 121 and an unmanned operation management system 122, for example, of a mining truck. In some embodiments, the unmanned vehicle 12 may be provided with one or more of a second positioning device 123 and a wireless communication device 124.

As shown in FIG. 2, the fleet management system 13 is a control center, a data center, and a decision center, which can realize functions such as path planning, task management, map management, unmanned vehicle scheduling, safety protection, traffic management, real-time monitoring, or data analysis. For example, the fleet management system 13 may be provided with a map management database 131 for storing the map of the unloading area UA. The fleet management system 13 may also be provided with a wireless communication device 132. The fleet management system 13 can realize information interaction with the unmanned vehicle 12 and the auxiliary operation equipment 11 through the wireless communication device 132. For example, the wireless communication devices 114/124/132 may use wireless communication technologies such as WIFI, MESH, 4G or 5G, but is not limited thereto.

Next, the operation flow of the unmanned vehicle 12 in the unloading area UA will be introduced in conjunction with FIGS. 1 and 2.

First, the unmanned driving system 121 of the unmanned vehicle 12 receives a travel instruction delivered by the fleet management system 13. The unmanned driving system 121 controls the unmanned vehicle 12 to automatically travel along a traveling road to an entry point of the waiting area WA according to a travel instruction and stop to wait. The unmanned operation management system 122 of the unmanned vehicle 12 feeds back the position of the entry point to the fleet management system 13.

Then, the fleet management system 13 automatically calculates to generate an unloading path according to the entry point, the position of a designated unloading point UP and the position of an exit point. Here, the unloading path comprises an entry path from the entry point to the unloading point UP and an exit path from the unloading point UP to the exit point. The fleet management system 13 may deliver the unloading path to the unmanned operation management system 122 of the unmanned vehicle 12 through the wireless communication device 132. After receiving the unloading path, the unmanned operation management system 122 of the unmanned vehicle 12 transfers the unloading path to the unmanned system 121 of the unmanned vehicle 12. The unmanned driving system 121 controls the unmanned vehicle 12 to travel to the designated unloading point according to the entry path.

Then, the unmanned vehicle 12 unloads the material at the designated unloading point UP.

After that, the unmanned driving system 121 controls the unmanned vehicle 12 to exit from the unloading area UA according to the exit path.

FIG. 3 is a flow chart of a method for updating map of an unloading area of an open pit mine according to some embodiments of the present disclosure.

At step 302, one or more coordinates of one or more first preset positions of the auxiliary operation equipment during operation process are acquired.

Here, the auxiliary operation equipment trims a retaining wall as a physical boundary of the unloading area during the operation process, and the physical boundary of the unloading area might change after trimming. For example, after one or more unmanned vehicles unload materials according to the current first map of the unloading area, the auxiliary operation equipment trims the retaining wall. For example, the first map is stored in the unmanned vehicle, and the unmanned vehicle travels at a corresponding position of the unloading area according to the first map during the operation in the unloading area.

In addition, each first preset position is located within the unloading area during the operation process of the auxiliary operation equipment. In some embodiments, during the operation process of the auxiliary operation equipment, the display of the auxiliary operation equipment may display the first map to assist the operator to operate.

It can be understood that, the coordinate of a first preset position may change during the operation process, so that a same first preset position may correspond to one or more coordinates during the operation process.

At step 304, a first coordinate set is determined. Here, the first coordinate set comprises a coordinate of the one or more coordinates of the first preset positions located outside the first map of the unloading area during the operation process.

In some embodiments, the distance between the coordinate in the first coordinate set and the boundary points of the first map of the unloading area is greater than a preset distance, for example, 0.3 meters. In other words, if the distance between a certain coordinate of the first preset position and the boundary point of the first map is not greater than the preset distance, the certain coordinate does not belong to the first coordinate set. In this way, the map updating times can be reduced.

At step 306, the first map is updated to a second map according to the first coordinate set.

In some embodiments, the first map of the unloading area may be updated to the second map in the following method.

First, a second coordinate set is determined. Here, second coordinate set comprises the coordinates of a plurality of boundary points (i.e., the first boundary points) of the first map of the unloading area.

Then, the union of the first coordinate set and the second coordinate set is determined. The union here comprises the coordinates of a plurality of second boundary points of the second map of the unloading area.

After the union of the first coordinate set and the second coordinate set is obtained, the coordinates of the boundary points (i.e., the second boundary points) of the second map can be obtained.

In the above embodiments, by acquiring one or more coordinates of a first preset position of the auxiliary operation equipment, the coordinate (s) outside the current map of the unloading area can be determined, and the current map of the unloading area can be further updated. In this way, the map updating efficiency of the unloading area is improved, thereby improving the operation efficiency of the unmanned vehicle in the unloading area of the open pit mine.

In some embodiments, in response to the click of the automatic acquisition button of the auxiliary operation management system of the auxiliary operation equipment from a user, the above steps 302-306 are automatically performed during the operation process of the auxiliary operation equipment, thereby updating the map of the unloading area.

Some specific implementations of the step 302 shown in FIG. 3 will be introduced below.

Firstly, the coordinate of a second preset position of the auxiliary operation equipment during the operation process may be acquired.

As some examples, the second preset position may be a cab of the auxiliary operation equipment. A first positioning device, such as a real-time kinematic (RTK) positioning device or a global positioning system (GPS) positioning device, is provided at the second preset position. The coordinate of the second preset position of the auxiliary operation equipment can be acquired through the first positioning device. For example, the first positioning device may be provided at a certain position of the cab.

Then, one or more coordinates of one or more first preset positions are determined according to the coordinate of the second preset position and the size of the auxiliary operation equipment.

It can be understood that, the coordinate of the first preset position can be calculated correspondingly according to the position of the first positioning device and the size of the auxiliary operation equipment.

In some embodiments, the auxiliary operation equipment comprises at least one of a loader or a bulldozer. Accordingly, the first preset position may comprise one certain position or some positions of the loader and the bulldozer.

Figure 4:
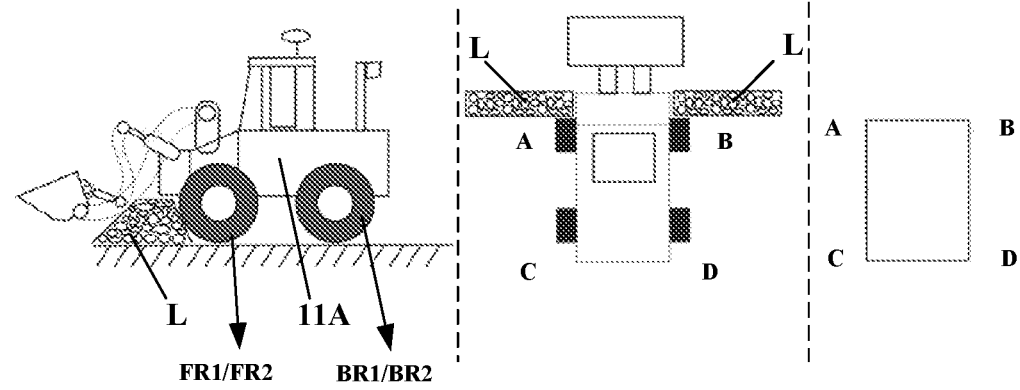
FIG. 4 is a schematic view showing operation of a loader according to some embodiments of the present disclosure.
Figure 5:
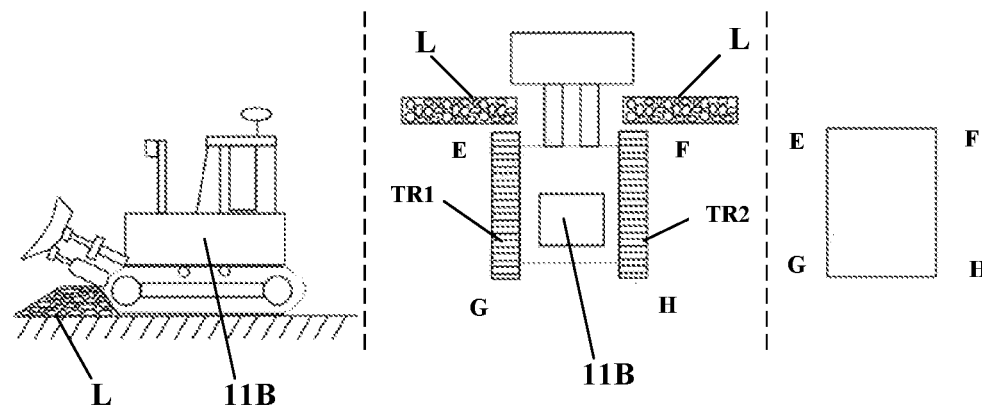
FIG. 5 is a schematic view showing operation of a bulldozer according to some embodiments of the present disclosure.

FIG. 4 is a schematic view showing operation of a loader according to some embodiments of the present disclosure. FIG. 5 is a schematic view showing operation of a bulldozer according to some embodiments of the present disclosure.

The first preset position in a case where the auxiliary operation equipments 11 comprise a loader 11A and a bulldozer 11B will be described below in conjunction with FIGS. 4 and 5.

As shown in FIG. 4, the loader 11A comprises a first front wheel FR1, a second front wheel FR2, a first back wheel BR1 and a second back wheel BR2. The first preset position of the auxiliary operation equipment 11 may comprise at least one of the first front wheel FR1 or the second front wheel FR2.

Referring to FIG. 4, the loader 11A is substantially perpendicular to the retaining wall L during the operation. To turn the material within the bucket outside the retaining wall L, the two front wheels of the loader are substantially in contact with the retaining wall L, that is, the two front wheels are in contact with the inner side of the retaining wall L. After pushing the material outside the retaining wall L, the loader 11A recedes and changes its position to shovel the material again to trim the retaining wall L. Therefore, the position of the edge of the inner side of the retaining wall L can be determined by the positions of the two front wheels of the loader 11A.

In some embodiments, the first preset positions of the auxiliary operation equipment 11 may comprise the frontmost position A of the first front wheel FR1 along a first travel direction of the loader 11A and the frontmost position B of the second front wheel FR2 along the first travel direction of the loader 11A.

The inventors have noticed that, in some cases, the loader 11A may not be perpendicular to the retaining wall L during the operation. In this case, the positions of the two back wheels of the loader 11A may be more proximate to the retaining wall L than the positions of the two front wheels. To update the map of the unloading area UA more accurately, in some embodiments, the first preset positions of the auxiliary operation equipment 11 may further comprise a first back wheel BR1 and a second back wheel BR2. For example, the first preset positions may comprise the backmost position C of the first back wheel BR1 along the first travel direction of the loader 11A and the backmost position D of the second back wheel BR2 along the first travel direction of the loader 11A.

As shown in FIG. 5, the bulldozer 11B comprises a first track TR1 and a second track TR2. The first preset position of the auxiliary operation equipment may comprise at least one of the first track TR1 or the second track TR2.

The bulldozer 11B is substantially perpendicular to the retaining wall L during the operation. To turn the material within the bulldozer blade outside the retaining wall L, the two tracks of the bulldozer 11B are substantially in contact with the inner side of the retaining wall L. After pushing the material outside the retaining wall L, the bulldozer 11B recedes and changes its position to push the material again to trim the retaining wall L. Therefore, the position of the edge of the inner side of the retaining wall L can be determined by the positions of the front ends of the two tracks of the bulldozer 11B.

In some embodiments, the first preset positions of the auxiliary operation equipment 11 may comprise the front-most position E of the first track TR1 along a second travel direction of the bulldozer 11B and the frontmost position F of the second track TR2 along the second travel direction of the bulldozer 11B.

To update the map of the unloading area UA more accurately, in some embodiments, the first preset positions of the auxiliary operation equipment 11 may further comprise the backmost position G of the first track TR1 along the second travel direction of the bulldozer 11B and the backmost position H of the second track TR2 along the second travel direction of the bulldozer 11B.

Figure 6A:
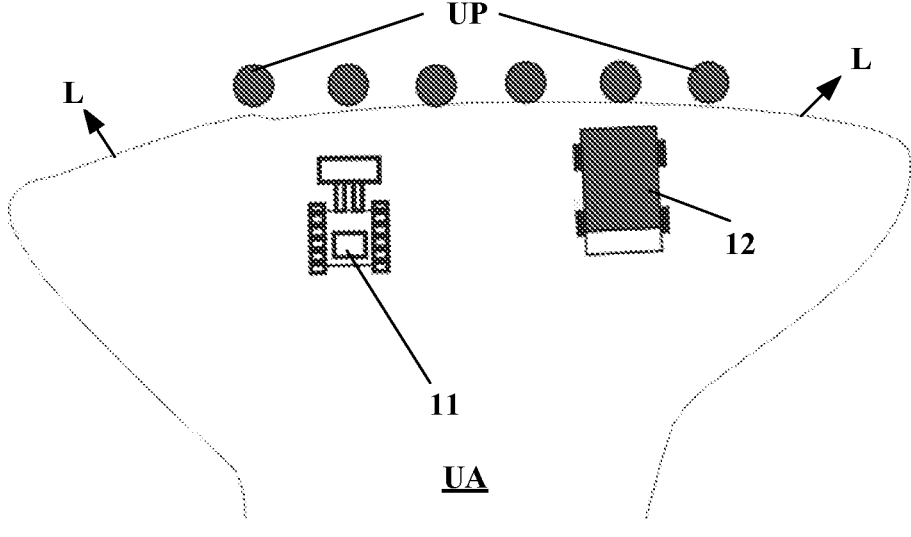
FIGS. 6A to 6C are schematic views of a changing process of an unloading area according to some embodiments of the present disclosure.
Figure 6B:
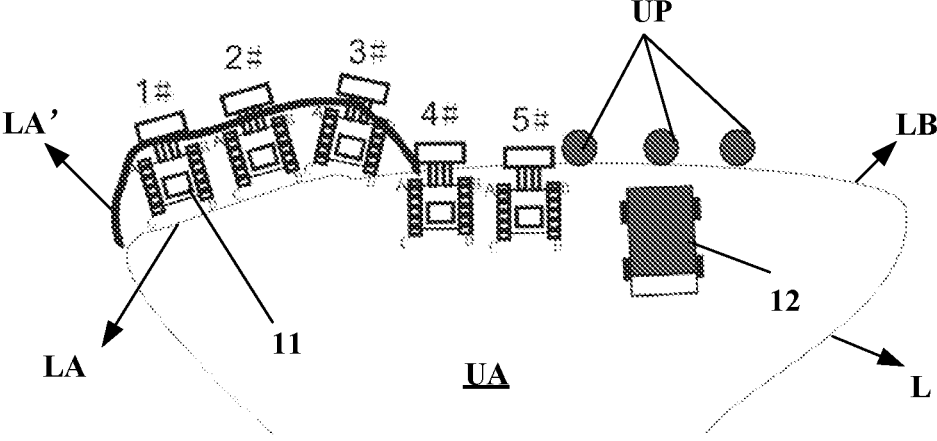
Figure 6C:
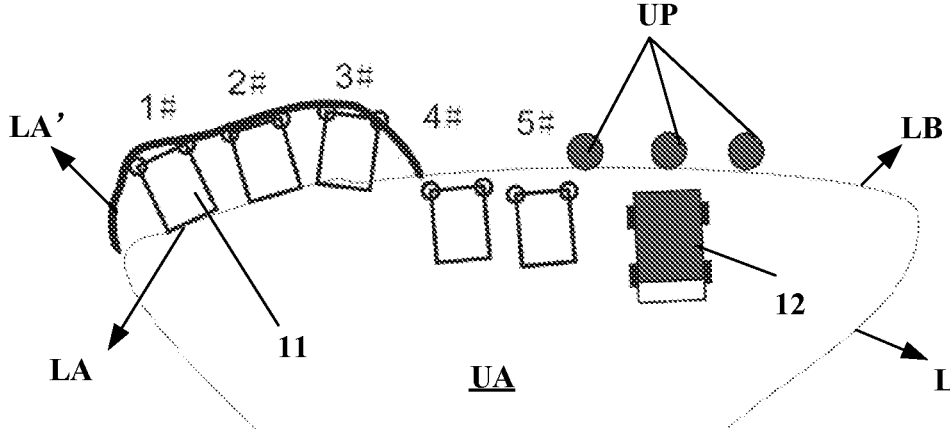

FIGS. 6A to 6C are schematic views of a changing process of an unloading area according to some embodiments of the present disclosure.

As shown in FIG. 6A, in the original map of the unloading area UA of the open pit mine, the unmanned vehicle 12 unloads the material to the designated unloading point UP according to the unloading rule. After the unmanned vehicle 12 finishes the operation in the unloading area UA, the auxiliary operation equipment 11 clears the unloading area UA and trims the retaining wall L. In some embodiments, the unmanned vehicle 12 and the auxiliary operation equipment 11 may be in operation in the unloading area UA at the same time. For example, the fleet management system 13, the unmanned operation management system 122 of the unmanned vehicle 12 and the auxiliary operation management system 1111 of the auxiliary operation equipment 11 can jointly ensure the safety between the unmanned vehicle 12 and the auxiliary operation equipment 11.

As shown in FIGS. 6B and 6C, the auxiliary operation equipment 11 operates according to a sequence from the position 1 # to the position 5 #. At the positions 1 # to 3 #, the first preset position of the auxiliary operation equipment 11 (for example, positions A, B, C and D) exceeds the boundary of the original map of the unloading area UA; while at the positions 4 # and 5 #, the first preset position of the auxiliary operation equipment 11 (for example, the positions A, B, C and D) does not exceed the boundary of the original map of the unloading area UA. For example, the coordinate of the first preset position of the auxiliary operation equipment 11 beyond the original map of the unloading area UA may be sent to the fleet management system 13, so that the fleet management system 13 updates the boundary of the map of the unloading area UA.

Referring to FIGS. 6B and 6C, a part LA of the retaining wall L is updated to LA', and the other part LB of the retaining wall L remains unchanged.

Figure 7:
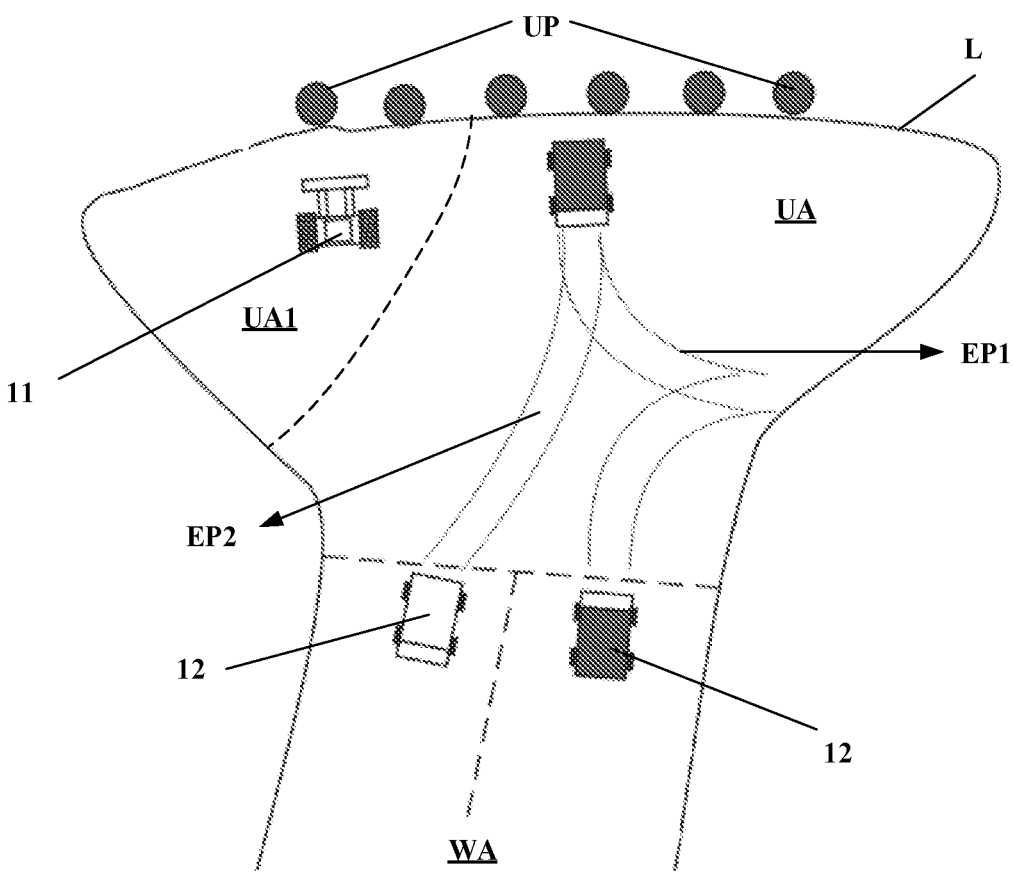
FIG. 7 is a schematic view showing an unloading area according to some embodiments of the present disclosure.

FIG. 7 is a schematic view showing an unloading area according to some embodiments of the present disclosure.

As shown in FIG. 7, the unloading area UA comprises a plurality of areas comprising the first area UA1. In the case where the auxiliary operation equipment 11 is in the first area UA1, each unmanned vehicle 12 is controlled to be in operation in an area of a plurality of areas other than the first area UA1. In this way, the safety of the auxiliary operation equipment 11 and its operator is ensured.

In some embodiments, before the first map of the unloading area UA is updated to the second map, the entry path EP1 in the unloading area UA of each unmanned vehicle 12 and the exit path EP2 in the unloading area UA of each unmanned vehicle 12 may be planned according to the first map of the unloading area UA. Referring to FIG. 7, in some embodiments, neither the entry path EP1 nor the exit path EP2 overlaps with the first area UA1.

In some embodiments, after the first map of the unloading area UA is updated to the second map, the entry path EP1 in the unloading area UA of each unmanned vehicle 12 and the exit path EP2 in the unloading area UA of each unmanned vehicle 12 may be planned according to the second map of the unloading area UA.

FIG. 8 is a flowchart of a method for updating map of an unloading area of an open pit mine according to other embodiments of the present disclosure. Only the differences between the embodiment shown in FIG. 8 and the embodiment shown in FIG. 3 will be mainly introduced below, and reference can be made to the above description for other similarities.

Compared with the embodiment shown in FIG. 3, the embodiment shown in FIG. 8 further comprises steps 802 to 806.

At step 802, the coordinate of each unmanned vehicle is acquired. For example, each unmanned vehicle is provided with a corresponding second positioning device, such as a GPS positioning device. The coordinate of a corresponding unmanned vehicle can be acquired through each second positioning device.

At step 804, whether each unmanned vehicle is not within the unloading area is determined according to the coordinate of each unmanned vehicle.

At step 806, the second map is sent to each unmanned vehicle, in a case where each unmanned vehicle is not within the unloading area, so that each unmanned vehicle updates the first map stored by itself to the second map.

If there is an unmanned vehicle in the unloading area, the step 806 is not performed.

In the above embodiments, in the case where each unmanned vehicle is not within the unloading area, the updated second map is sent to each unmanned vehicle so that each unmanned vehicle updates the first map stored by itself to the second map. In this way, on the one hand, the consistency of the maps of various unmanned vehicle is ensured; on the other hand, the safety problem caused by the updating of the map to the operation of the unmanned vehicle is avoided.

In some embodiments, in the case where each unmanned vehicle is not within the unloading area, the second map is also sent to the auxiliary operation equipment, so that the auxiliary operation equipment updates the first map stored by itself to the second map. In this way, various operation devices of the open pit mine store a consistent map to better perform the operation.

FIG. 9 is a schematic structural view showing a device for updating map of an unloading area of an open pit mine according to some embodiments of the present disclosure.

As shown in FIG. 9, the device for updating map of an unloading area of an open pit mine comprises an acquiring module 901, a determining module 902 and an updating module 903.

The acquiring module 901 is configured to acquire one or more coordinates of one or more first preset positions of the auxiliary operation equipment during the operation process. Here, the auxiliary operation equipment trims a retaining wall as a physical boundary of the unloading area during the operation process. In addition, each first preset position is located within the unloading area during the operation process of the auxiliary operation equipment.

The determining module 902 is configured to determine a first coordinate set. Here, the first coordinate set comprises a coordinate of the one or more coordinates located outside the first map.

The updating module 903 is configured to update the first map to the second map according to the first coordinate set.

In the above embodiments, by acquiring one or more coordinates of a first preset position of the auxiliary operation equipment, the coordinate(s) outside the current map of the unloading area can be determined, and the current map of the unloading area can be further updated. In this way, the map updating efficiency of the unloading area is improved, thereby improving the operation efficiency of the unmanned vehicle in the unloading area of the open pit mine.

Figure 10:
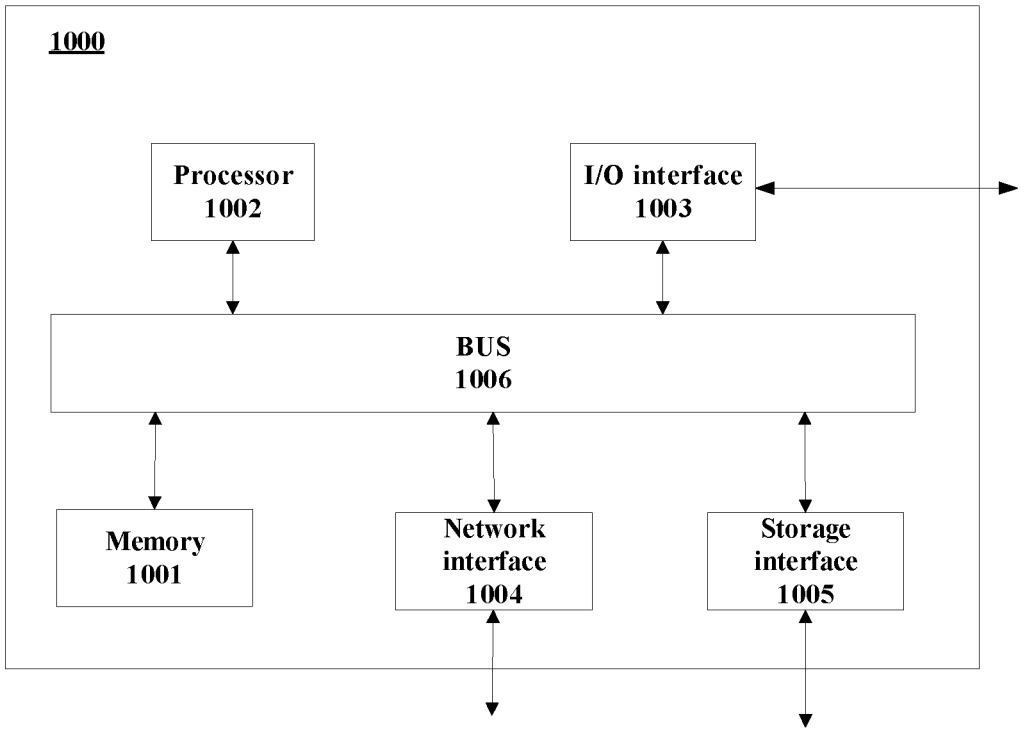
FIG. 10 is a schematic structural view showing a device for updating map of an unloading area of an open pit mine according to other embodiments of the present disclosure.

FIG. 10 is a schematic structural view showing a device for updating map of an unloading area of an open pit mine according to other embodiments of the present disclosure.

As shown in FIG. 10, the device 1000 for updating map of an unloading area of an open pit mine comprises a memory 1001 and a processor 1002 coupled to the memory 1001. The processor 1002 is configured to perform the method according to any of the above embodiments based on instructions stored in the memory 1001.

The memory 1001 may comprise, for example, a system memory, a fixed nonvolatile storage medium, or the like. The system memory may store, for example, an operation system, an application program, a boot loader, and other programs.

The map updating device 1000 of the unloading area of the open pit mine may further comprise an I/O interface 1003, a network interface 1004, and a storage interface 1005, and the like. These interfaces 1003, 1004 and 1005 therebetween, as well as the memory 1001 and the processor 1002 therebetween, may be connected by a bus 1006, for example. The I/O interface 1003 provides a connection interface for I/O devices such as a display, a mouse, a keyboard, or a touch screen. The network interface 1004 provides a connection interface for various networking devices. The storage interface 1005 provides a connection interface for an external storage device such as a SD card or a USB flash drive.

The embodiments of the disclosure also provide a system for updating map of an unloading area of an open pit mine.

Referring to FIG. 2, the system for updating map of an unloading area of an open pit mine comprises an industrial personal computer 111 and a fleet management system 13.

The industrial personal computer 111 is arranged on the auxiliary operation equipment 11 and comprises an auxiliary operation management system 1111. The auxiliary operation management system 1111 is configured to acquire one or more coordinates of one or more first preset positions of the auxiliary operation equipment 11 during the operation; and determine a first coordinate set. Here, the first coordinate set comprises a coordinate of the one or more coordinates located outside the first map of the unloading area.

The auxiliary operation equipment 11 trims a retaining wall as a physical boundary of the unloading area during the operation process. In addition, during the operation process of the auxiliary operation equipment 11, each first preset position is located within the unloading area.

The fleet management system 13 is configured to update the stored first map to a second map according to the first coordinate set. For example, the fleet management system 13 comprises a map management database 131 and the first map of the unloading area is stored in the map management database 131.

In the above embodiments, the industrial personal computer 111 on each auxiliary operation equipment 11 determines the first coordinate set beyond the coordinates of the first map of the unloading area, and the fleet management system 13 updates the stored first map to the second map according to the first coordinate set. In this way, in a case where there is a large number of auxiliary operation equipments 11, the pressure of the fleet management system 13 is reduced, thereby improving the map updating accuracy of the unloading area.

In some embodiments, referring to FIG. 2, the system for updating map of an unloading area of an open pit mine further comprises a first positioning device 113 arranged at a second preset position of the auxiliary operation equipment 11 and configured to send the coordinate of the second preset position to the auxiliary operation management system 1111. The auxiliary operation management system 1111 is configured to determine one or more coordinates of one or more first preset positions of the auxiliary operation equipment 11 according to the coordinate of the second preset position and the size of the auxiliary operation equipment 11.

In some embodiments, referring to FIG. 2, the system for updating map of an unloading area of an open pit mine further comprises a second positioning device 123 arranged on each unmanned vehicle 12 and configured to send the coordinate of each unmanned vehicle 12 to the fleet management system 13. The fleet management system 13 is configured to determine whether each unmanned vehicle 12 is within the unloading area according to the coordinate of each unmanned vehicle 12; and send the second map to each unmanned vehicle 12 in a case where each unmanned vehicle 12 is not within the unloading area, so that each unmanned vehicle 12 updates the first map stored by itself to the second map.

In some embodiments, the fleet management system 13 is further configured to send the second map to the auxiliary operation management system 1111 of the auxiliary operation equipment 11 in the case where each unmanned vehicle 12 is not within the unloading area, so that the auxiliary operation management system 1111 updates the first map stored by itself to the second map.

It should be noted that, the unmanned driving system. 121, the unmanned operation management system. 122 and the auxiliary operation management system 1111 may each comprise at least one memory 1001 and at least one processor 1002 like those shown in FIG. 10. The processor 1002 is configured to perform respective functions of the unmanned driving system 121, the unmanned operation management system 122 and the auxiliary operation management system 1111 based on the instructions stored in the memory 1001.

Various embodiments in this specification are described in a progressive manner, and each embodiment focuses on description of the differences from other embodiments. For the same or similar parts between various embodiments, reference can be made to each other. As for the embodiments of the device, since they substantially correspond to the embodiments of the method, the descriptions are relatively simple. For the relevant parts, reference can be made to some descriptions of the embodiments of the method.

The embodiments of the present disclosure further provide a computer readable storage medium having instructions of a computer program stored thereon that, when executed by a processor implement the map updating method according to any of the above embodiments.

Hereto, various embodiments of the present disclosure have been described in detail. Some details well known in the art are not described to avoid obscuring the concept of the present disclosure. According to the above description, those skilled in the art would fully understand how to implement the technical solutions disclosed here.

Those skilled in the art should understand that, the embodiments of the present disclosure may be provided as a method, a device, or a computer program product. Therefore, embodiments of the present disclosure can take the form of an entirely hardware embodiment, an entirely software embodiment or an embodiment combining both hardware and software. Moreover, the present disclosure may take the form of a computer program product embodied on one or more computer-usable non-transitory storage media (including but not limited to disk storage, CD-ROM, optical memory, etc.) having computer-usable program code embodied therein.

The present disclosure is described with reference to flowcharts and/or block diagrams of methods, devices (systems) and computer program products according to embodiments of the present disclosure. It should be understood that each process in the flowcharts and/or the functions specified in one or more blocks of the block diagrams may be implemented by computer program instructions. The computer program instructions may be provided to a processor of a general-purpose computer, a special purpose computer, an embedded processor, or other programmable data processing device to generate a machine, making the instructions executed by a processor of a computer or other programmable data processing device generate means implementing the functions specified in one or more flows of the flowcharts and/or one or more blocks of the block diagrams.

The computer program instructions may also be stored in a computer readable memory device capable of directing a computer or other programmable data processing device to operate in a specific manner such that the instructions stored in the computer readable memory device produce an article of manufacture including an instruction means implementing the functions specified in one or more flows of the flowcharts and/or one or more blocks of the block diagrams.

These computer program instructions can also be loaded onto a computer or other programmable device to perform a series of operation steps on the computer or other programmable device to generate a computer-implemented process such that the instructions executed on the computer or other programmable device provide steps implementing the functions specified in one or more flows of the flowcharts and/or one or more blocks of the block diagrams.

Although some specific embodiments of the present disclosure have been described in detail by way of examples, those skilled in the art should understand that the above examples are only for the purpose of illustration but not for limiting the scope of the present disclosure. It should be understood by those skilled in the art that modifications to the above embodiments and equivalent substitution of part of the technical features can be made without departing from the scope and spirit of the present disclosure. The scope of the present disclosure is defined by the appended claims.

What is claimed is:

1. A method for updating map of an unloading area of an open pit mine, comprising:
   acquiring one or more coordinates of one or more first preset positions of an auxiliary operation equipment during an operation process by an auxiliary operation management system arranged in an industrial personal computer on the auxiliary operation equipment, wherein
   the auxiliary operation equipment trims a retaining wall as a physical boundary of the unloading area during the operation process, and,
   each first preset position is located within the unloading area during the operation process of the auxiliary operation equipment;
determining a first coordinate set, wherein the first coordinate set comprises a coordinate, of the one or more coordinates, outside a first map of the unloading area by the auxiliary operation management system;
updating the first map stored in a map management database in a fleet management system to a second map according to the first coordinate set by the fleet management system;
planning an entry path and an exit path in the unloading area of each unmanned vehicle of one or more unmanned vehicles according to the first map by the fleet management system, before updating the first map to the second map, wherein each unmanned vehicle comprises (i) an unmanned driving system that controls the unmanned vehicle to automatically travel along a travelling road to an entry point according to a travel instruction delivered by the fleet management system and (ii) an unmanned operation management system that feeds back a position of the entry point to the fleet management system;
planning the entry path and the exit path in the unloading area of each unmanned vehicle according to the second map by the fleet management system, after updating the first map to the second map;
acquiring a coordinate of each unmanned vehicle by the fleet management system;
determining whether each unmanned vehicle is not within the unloading area according to the coordinate of each unmanned vehicle by the fleet management system; and
sending the second map to each unmanned vehicle by the fleet management system, in a case where each unmanned vehicle is not within the unloading area, so that each unmanned vehicle updates the first map stored by itself to the second map,
wherein the auxiliary operation equipment comprises at least one of a loader or a bulldozer, wherein:
the loader comprises a first front wheel, a second front wheel, a first back wheel and a second back wheel, the one or more first preset positions comprise a foremost position of the first front wheel along a first travel direction of the loader, a foremost position of the second front wheel along the first travel direction, a backmost position of the first back wheel along the first travel direction of the loader, and a backmost position of the second back wheel along the first travel direction; and/or
the bulldozer comprises a first track and a second track, the one or more first preset positions comprise a foremost position of the first track along a second travel direction of the bulldozer, a foremost position of the second track along the second travel direction, a backmost position of the first track along the second travel direction, and a backmost position of the second track along the second travel direction.

2. The method according to claim 1, wherein the updating the first map to a second map according to the first coordinate set comprises:

determining a second coordinate set, wherein the second coordinate set comprises coordinates of a plurality of first boundary points of the first map; and determining a union of the first coordinate set and the second coordinate set, wherein the union comprises coordinates of a plurality of second boundary points of the second map.

3. The method according to claim 1, wherein the acquiring one or more coordinates of one or more first preset positions of an auxiliary operation equipment during operation process comprises:

acquiring a coordinate of a second preset position of the auxiliary operation equipment during the operation process, wherein the second preset position is provided with a first positioning device; and determining the one or more coordinates of the one or more first preset positions according to the coordinate of the second preset position and a size of the auxiliary operation equipment.

4. The method according to claim 1, wherein the unloading area comprises a plurality of areas, and the entry path and the exit path do not overlap with a first area in a case where the auxiliary operation equipment is in the first area.

5. The method according to claim 1, further comprising:

sending the second map to the auxiliary operation equipment by the fleet management system, in the case where each unmanned vehicle is not within the unloading area, so that the auxiliary operation equipment updates the first map stored by itself to the second map.

6. A system for updating map of an unloading area of an open pit mine, comprising:

an industrial personal computer arranged on an auxiliary operation equipment and comprising an auxiliary operation management system, wherein the auxiliary operation management system is configured to acquire one or more coordinates of one or more first preset positions of the auxiliary operation equipment during operation process; and determine a first coordinate set, wherein the first coordinate set comprises a coordinate, of the one or more coordinates, outside a first map of the unloading area, wherein the auxiliary operation equipment trims a retaining wall as a physical boundary of the unloading area during the operation process, and each first preset position is located within the unloading area during the operation process of the auxiliary operation equipment; and a fleet management system configured to:

update the first map stored in a map management database in the fleet management system to a second map according to the first coordinate set;

plan an entry path and an exit path in the unloading area of each unmanned vehicle of one or more unmanned vehicles according to the first map, before updating the first map to the second map, wherein each unmanned vehicle comprises (i) an unmanned driving system that controls the unmanned vehicle to automatically travel along a travelling road to an entry point according to a travel instruction delivered by the fleet management system and (ii) an unmanned operation management system that feeds back a position of the entry point to the fleet management system;

plan the entry path and the exit path in the unloading area of each unmanned vehicle according to the second map, after updating the first map to the second map;

acquire a coordinate of each unmanned vehicle;

determine whether each unmanned vehicle is not within the unloading area according to the coordinate of each unmanned vehicle; and send the second map to each unmanned vehicle, in a case where each unmanned vehicle is not within the unloading area, so that each unmanned vehicle updates the first map stored by itself to the second map.

7. The system according to claim 6, further comprising:

a first positioning device arranged at a second preset position of the auxiliary operation equipment and configured to send a coordinate of the second preset position to the auxiliary operation management system, wherein the auxiliary operation management system is configured to determine the one or more coordinates of the one or more first preset positions according to the coordinate of the second preset position and a size of the auxiliary operation equipment.

8. The system according to claim 6, further comprising:

a second positioning device arranged on each unmanned vehicle of the one or more unmanned vehicles and configured to send the coordinate of each unmanned vehicle to the fleet management system.

9. The system according to claim 8, wherein the fleet management system is further configured to send the second map to the auxiliary operation management system, in the case where each unmanned vehicle is not within the unloading area, so that the auxiliary operation management system updates the first map stored by itself to the second map.

10. A non-transitory computer-readable storage medium having stored thereon computer program instructions that, when executed by a processor, implement the map updating method according to claim 1.

* * * * *